United States Patent [19]

Chiang et al.

[11] Patent Number: 4,584,183
[45] Date of Patent: Apr. 22, 1986

[54] PROCESS FOR SEPARATING ZIRCONIUM ISOTOPES

[75] Inventors: Peter T. Chiang, Monroeville; Edward J. Lahoda, Edgewood; Herbert A. Burgman, Murrysville, all of Pa.

[73] Assignee: Westinghouse Electric Corp., Pittsburgh, Pa.

[21] Appl. No.: 564,055

[22] Filed: Dec. 21, 1983

[51] Int. Cl.⁴ .................. C01G 25/00; B01D 59/00
[52] U.S. Cl. .......................................... 423/2; 423/70
[58] Field of Search .................. 423/70, 2; 210/634

[56] References Cited

U.S. PATENT DOCUMENTS 3,069,232  12/1962  Greenberg et al. .......... 423/70 X
4,389,292   6/1983  Phillips et al. ............. 204/158 R

FOREIGN PATENT DOCUMENTS 2104797  3/1983  United Kingdom .............. 423/6

OTHER PUBLICATIONS

K. Kogure et al., Journal of Chromatography, 259, (1983), pp. 480–486, Elsevier Sci. Pub. Amsterdam.

Primary Examiner—Teddy S. Gron
Assistant Examiner—Virginia B. Caress
Attorney, Agent, or Firm—R. D. Fuerle

[57] ABSTRACT

A solvent extraction-exchange process for the enrichment of either the zirconium 90 isotope component or the zirconium 91–96 isotope component of an aqueous feed stream containing both components is described. An aqueous feed stream of zirconium complexes such as that from a thiocyanate separation process is contacted with an organic solvent to preferentially extract one of the isotope components, resulting in an aqueous raffinate enriched in the other isotope component. The organic phase is further contacted with an aqueous phase enriched in said one isotope component to exchange the other isotope component from the organic phase with the one isotope component in the aqueous phase and produce a further enriched organic phase. The one isotope component in the further enriched organic phase is then stripped with an aqueous acidic strip medium, and zirconium enriched in said one isotope component separated therefrom.

19 Claims, 1 Drawing Figure

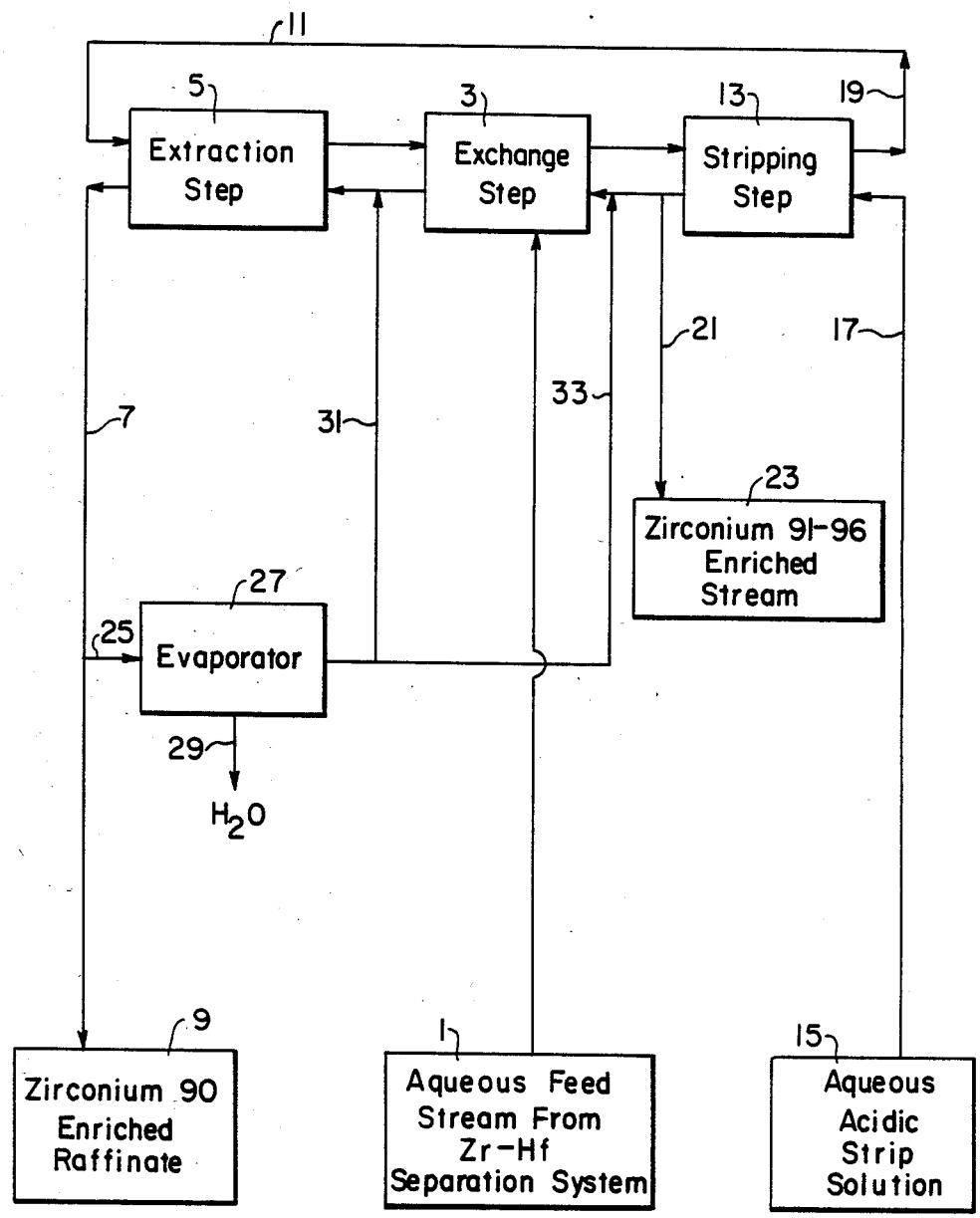

PROCESS FOR SEPARATING ZIRCONIUM ISOTOPES

BACKGROUND OF THE INVENTION

The use of zirconium as a cladding in nuclear fuel rods is known. There are, however, five common isotopes of zirconium: zirconium 90, zirconium 91, zirconium 92, zirconium 94, and zirconium 96, which isotopes have very different capture cross-sections for thermal neutrons. They are: 0.03 b (barns) for zirconium 90, 1.1 b for zirconium 91, 0.2 b for zirconium 92, 0.055 b for zirconium 94, and 0.02 b for zirconium 96. A significant improvement would be provided in nuclear fuel cladding if the zirconium 90 isotope concentration could be increased, in zirconium used in the cladding, above the about 51.5 percent level found in natural zirconium. The higher the level of zirconium 90 in the cladding, the more beneficial the properties.

There are several known isotope separation techniques, such as gas diffusion, gas centrifuging, electromagnetic separation, and chemical exchange, for the separation of lithium, boron, calcium, titanium, and uranium isotopes, and some proposals to separate zirconium isotopes, such as by use of a laser or photoexcitation and separation steps. Isotope separation processes using lasers incur considerable expense.

In the separation of zirconium from ores that normally contain hafnium values, the use of solvent extraction of thiocyanate complexes of these metals is generally used. This process comprises extracting an aqueous solution of hafnium and zirconium salts containing ammonium thiocyanate with an ether, or methylisobutyl ketone (MIBK), solution of thiocyanic acid, with the hafnium preferentially passing to the organic layer, while the zirconium remains in the aqueous layer. Such a process is referred to in U.S. Pat. No. 3,069,232, which teaches an improvement where a saturated solution of ammonium sulfate is used, instead of sulfuric acid, to re-extract hafnium values from the organic phase.

We have now discovered that the complexes such as thiocyanate complexes, of zirconium isotopes, such as a zirconium 90 isotope component or a zirconium 91–96 isotope component, of a mixture of zirconium 90–96 isotopes, in an aqueous phase can be preferentially extracted to an organic phase so as to enrich a zirconium isotope component content in the aqueous phase. Exchange can then be effected to produce an enriched zirconium isotope component product.

It is an object of the present invention to provide a process for the enrichment of either a zirconium 90 isotope component or a zirconium 91–96 isotope component in a mixture containing those two components.

It is another object of the present invention to provide a solvent extraction-exchange process for the enrichment of either the zirconium 90 component or the zirconium 91–96 component in a mixture containing those two components.

It is a further object of the present invention to provide a solvent extraction-exchange process for enriching either the zirconium 90 isotope component or the zirconium 91–96 isotope component of an aqueous zirconium-containing feed stream, from a hafnium-zirconium separation system using a thiocyanate complex.

SUMMARY OF THE INVENTION

The zirconium 90 isotope component concentration or the zirconium 91–96 isotope component concentration in an aqueous solution containing zirconium 90–96 isotopes is enriched by extracting one of the zirconium isotope components preferentially from an aqueous solution by contact with an organic, water-immiscible solvent that may also contain an extractant medium. An enriched aqueous phase, enriched in the other zirconium isotope component, is produced from which a portion is removed to recover that isotope component, while the remaining portion is returned to the system to be used as a refluxing stream. The enriched organic phase produced in the extraction step, enriched in the one zirconium isotope component is contacted with the feed stream and reflux stream containing both zirconium isotope components to effect an exchange wherein said one isotope component passes from the enriched organic phase to the aqueous streams, while the other zirconium isotope component passes to the organic phase to form a further enriched organic phase. The combined aqueous medium is passed to the extraction step, while the further enriched organic phase is passed to a stripping step. In the stripping step, the further enriched organic phase is contacted with an aqueous acidic strip medium, such that the zirconium is transferred to the aqueous acidic strip medium, and the organic phase then separated. A portion of the aqueous acidic strip medium, following the transfer, is separated and the zirconium isotope component recovered, while the remainder is passed to the exchange step for reuse as a reflux material. The separated organic phase is recycled to the extraction step for reuse as the organic, water-immiscible solvent in that step.

By use of a number of extraction and exchange steps, an increase in the zirconium 90 content of the discharged aqueous raffinate or of the discharged aqueous strip medium to about ninety percent is achievable.

BRIEF DESCRIPTION OF THE DRAWING

The drawing is a flow chart schematically illustrating the present process for enrichment of zirconium 90 isotope in a feed stream from a thiocyanate process for zirconium-hafnium separation.

DETAILED DESCRIPTION

The present process provides a process for enriching either the zirconium 90 component, or zirconium 91–96 component, content of an aqueous solution of zirconium isotopes, preferably resulting from the thiocyanate complex separation of hafnium and zirconium.

Because hafnium and zirconium naturally occur together and it is desirable to separate the zirconium from the hafnium, which is a difficult separation, processes have been developed which involve the preferential solvent extraction of hafnium as a thiocyanate complex. The hafnium thiocyanate complex thus is separated as an organic solution, while a resultant aqueous solution containing the zirconium thiocyanate complex is produced. It is to the treatment of this aqueous zirconium thiocyanate complex solution that the preferred embodiment of the present invention is specifically directed.

As illustrated in the drawing, which illustrates an embodiment of the present invention where zirconium 91–96 is extracted into an organic phase while the zirconium 90 content of an aqueous raffinate is enhanced, an aqueous feed stream 1, from a zirconium-hafnium separation system, is passed to an exchange system 3 more fully explained hereinafter. The aqueous solution containing a mixture of zirconium isotopes is then passed to an extraction system 5 where the aqueous solution is contacted with an organic water-immiscible solvent which preferentially extracts the zirconium 91-96 isotopes while producing an aqueous raffinate phase enriched in zirconium 90 isotope. The aqueous raffinate is discharged from the extraction system through line 7 and the zirconium, enriched in zirconium 90 is recovered from stream 9 to give the desired zirconium 90 enriched product.

An organic water-immiscible solvent is charged to the extraction system 5 through line 11 and contacts the aqueous solution therein. The organic water-immiscible solvent, methylisobutyl ketone in this instance, preferentially extracts zirconium 91-96 from the aqueous solution to produce an enriched organic phase that is enriched in zirconium 91-96 isotopes and contains some zirconium 90 isotope. This enriched organic phase is passed to the exchange system 3.

In the exchange system 3, the enriched organic phase, enriched in zirconium 91-96 is contacted with aqueous feed and refluxing media containing the zirconium 90 and 91-96 isotopes. Since the organic phase is enriched in zirconium 91-96, an exchange is effected whereby residual zirconium 90 from the organic phase passes to the aqueous feed stream, while zirconium 91-96 passes from the aqueous phase into the enriched organic phase.

The further enriched organic phase so produced, enriched in zirconium 91-96 isotopes is next passed to a stripping system 13. In the stripping system 13, the further enriched organic phase, enriched in zirconium 91-96 isotopes, is contacted with an aqueous acidic strip medium 15 supplied thereto through line 17, to effect transfer of the zirconium to the aqueous phase and produce an aqueous acidic strip medium enriched in zirconium 91-96 isotopes. The organic phase, after stripping of the zirconium therefrom, is then recycled through line 19 to line 11 for reuse as organic water-immiscible solvent in the extraction system 5. A portion of the separated aqueous acidic strip medium from the stripping system is passed through line 21, and the zirconium, enriched in zirconium 91-96, is recovered from stream 23 to give a zirconium 91-96 enriched product, while another portion of the aqueous acidic strip medium is returned to the exchange system 3 for refluxing.

As illustrated, a portion of the zirconium 90 enriched aqueous raffinate is discharged from line 7 through line 25 to an evaporator 27 where a portion of the water is removed and discharged through line 29, while a stream of the concentrated zirconium 90 aqueous phase, produced by evaporating off some of the water in the evaporator 27, is passed through line 31 and introduced into the system intermediate the exchange system 3 and the extraction system 5, and while a further stream of concentrated zirconium 90 aqueous phase is passed through line 33 and introduced into the system intermediate the stripping system 13, following line 21, and the exchange system 3.

In the preferred embodiment of the present invention, the aqueous feed solution of zirconium isotopic complexes comprise an aqueous solution of thiocyanate complexes of zirconium resulting from a zirconium-hafnium thiocyanate separation process, while the preferred organic water-immiscible solvent is methylisobutyl ketone and the aqueous acidic strip medium comprises aqueous hydrochloric acid.

The sequence of steps using a thiocyanate feed stream, methylisobutyl ketone (MIBK) as the organic, water-immiscible solvent and hydrochloric acid as the aqueous acidic strip medium, can be expressed by the following equations:

Extraction Step
$^{90-96}ZrO^{2+}$ (aq) + xMIBK.2HSCN (org) $\rightleftharpoons$
$^{90-96}ZrO(SCN)_2$.xMIBK (org) + $^{90}ZrO^{2+}$ (aq) + 2H$^+$ (aq)

Exchange Step
$^{90}ZrO(SCN)_2$.xMIBK (org) + $^{91-96}ZrO^{2+}$ (aq) $\rightleftharpoons$
$^{91-96}ZrO(SCN)_2$.xMIBK (org) + $^{90}ZrO^{2+}$ (aq)

Stripping Step
$^{91-96}ZrO(SCN)_2$.xMIBK (org) + 2HCl (aq) $\rightleftharpoons$
$^{91-96}ZrOCl_2$ (aq) + xMIBK.2HSCN (org)

This sequence thus provides an aqueous raffinate enriched in zirconium 90 and an aqueous acidic strip medium enriched in zirconium 91-96.

In the above-identified reaction sequence, as an example, samples of zirconium 90 enriched raffinate stream and the zirconium-loaded organic stream were obtained for zirconium isotope determinations from a 10-stage solvent extraction plant which separates hafnium from zirconium using thiocyanate-MIBK solvent. The results were:

|  | $^{90}Zr$ | $^{91}Zr$ | $^{92}Zr$ | $^{94}Zr$ | $^{96}Zr$ |
|---|---|---|---|---|---|
| Raffinate Stream, wt. % | 53.05 | 13.39 | 16.70 | 14.61 | 2.25 |
| Organic Stream, wt. % | 51.24 | 13.56 | 17.56 | 15.35 | 2.29 |

The overall separation factor ($\alpha_{10}$) from the 10-stage extraction-exchange operation [$\alpha$ is defined as $^{90}Zr/^{91-96}Zr$)raff/($^{90}Zr/^{91-96}Zr$)org] was calculated to be $\alpha_{10}=1.075$. This value was converted to a single-stage $\alpha_1=1.007$ which, in turn, was used for estimating the number of theoretical stages required to obtain a 90 percent, zirconium 90 enrichment level. This calculation yields the number of theoretical stages of 370. These theoretical stages, when applied to the attached drawing would result in the use of about 120 stages in the extraction step 5, 240 stages in the exchange step 3, and 10 stages in the stripping step 13.

In addition to the use of a pure organic water-immiscible solvent, such a solvent can be used which contains an extractant medium, such as a liquid ion exchange compound, which will preferentially effect the extraction of one of the zirconium isotope components from the aqueous feed solution. As examples of the extractant medium, and dependent upon the acidic media, such extractant medium would include quaternary ammonium salts such as tricaprylyl methyl ammonium chloride (Aliquat 336); organic phosphonates such as dibutylbutylphosphonate; organic phosphinates such as di(2,4,4'-trimethylpentyl)phosphinate; organic phosphates such as di(2-ethylhexyl)phosphate; organic sulfonates such as dinonylnaphthalenesulfonic acid; primary amines such as that sold under the tradename Primene JMT, sold by Rohm & Haas; tertiary amines such as tri-n-octyl amine; polyethers such as (2,2,1) cryptand; and beta-diketones, such as thenoyltrifluoroacetone.

The extractant medium added to the organic water-immiscible solvent should be present in the solvent in an amount that provides a mole ratio relative to the zirconium present in the aqueous medium of between 4:1 to 1:4 based on a solvent to aqueous phase ratio of 1:1 by volume. Also, in those instances where two extractants are present, the two extractants should be present in an amount that provides a mole ratio of 4:1 to 1:4 between the two extractants. The extractant medium should be present in the organic, water-immiscible solvent as a solution of between 0.05 to 1.0 molar solution.

The preferred organic, water-immiscible solvent is methylisobutyl ketone. Other organic, water-immiscible solvents are also usable, however, in connection with the use of an extractant medium, such as alkyl hydrocarbons such as heptane; aryl hydrocarbons such as benzene; and mixtures of hydrocarbons such as kerosene. In addition, mixtures of such solvents may be used, or the solvent may contain a water-immiscible alkyl alcohol containing 6–8 carbon atoms as a phase modifier. Such alkyl alcohols should be present in the organic water-immiscible solvent in an amount of between about 3–20 percent by volume based on the solvent.

The preferred zirconium complex present in the aqueous feed stream is the thiocyanate complex, $ZrO(SCN)_2$, while the process is usable with other zirconium complexes, such as nitrate, sulfate, chloride, or perchlorate complexes.

The aqueous acidic strip medium used in the stripping step will vary dependent upon the particular system, but should be an inorganic acidic aqueous medium containing an inorganic acid selected from the group consisting of hydrochloric acid, nitric acid, sulfuric acid, and perchloric acid.

As examples of various aqueous feed solutions of zirconium complexes, organic water-immiscible solvents, which may contain an extractant medium, or two of the same, and an aqueous acidic strip medium usable in the present process, reference is made to the following table which lists such systems. In the table, the first five systems listed provide a process wherein the zirconium 90 content is increased in the aqueous phase while zirconium 91–96 is extracted into the organic phase; while in the last three systems listed, the zirconium 91–96 content is increased in the aqueous phase while zirconium 90 is extracted into the organic phase.

The present process is usable in enriching the zirconium isotope component content of aqueous feed streams which contain a zirconium concentration of between 0.05 mole to 2.0 moles of zirconium per liter of aqueous feed stream. The free acid concentration of the aqueous media fed to the exchange and extraction steps should be in an amount of about 1–10 moles per liter of aqueous medium.

The time required for equilibration of the system, that is, the time of contact between the organic phase and the aqueous phase in the extraction step, will vary depending on the extractant, water-immiscible solvent used, aqueous feed solution, etc., but will normally be between 2–120 minutes per stage. The number of extraction and exchange stages, however, will depend upon the type of extractant medium, the organic, water-immiscible solvent, the zirconium feed stream, the aqueous acidic strip medium and other factors and will be numerous stages. For examples, in connection with a zirconium thiocyanate, methylisobutyl ketone solvent, and hydrochloric acid strip medium, the use of 370 stages for a 90 percent level of zirconium 90 enrichment would be needed, as described hereinbefore.

The extraction and exchange steps can be effected in columns, such as packed, agitated, or perforated plate columns. The other standard solvent extraction equipment, such as mixer-settlers and centrifugal contacters, can also be used depending upon the particular system.

What is claimed is:

1. A method of separating a feed stream consisting essentially of an aqueous solution of a mixture of $^{90}Zr$ and $^{91\ to\ 96}Zr$ salts selected from group consisting of thiocyanate, nitrate, sulfate, chloride, perchlorate, and mixtures thereof, into two aqueous product streams, each containing both a $^{90}Zr$ isotopic portion and a $^{91\ to\ 96}Zr$ isotopic portion, but in different ratios, comprising (A) contacting said feed stream with methylisobutyl ketone or an organic water-immiscible solvent containing an extractant medium selected from the

| Aqueous Feed Stream | Organic, Water-Immiscible Solvent | Extractant Medium | Free Acid in Feed Stream | Zirconium 90 Separation Factor (single stage) |
|---|---|---|---|---|
| $ZrO\ (SCN)_2$ | Methylisobutyl ketone | Methylisobutyl ketone | HCl | 1.007 |
| $Zr\ (SO_4)_2$ | Heptane | Dinonylnaphthalene Sulfonic Acid plus Di (2-ethylhexyl) phosphate | $H_2SO_4$ | 1.001 |
| $Zr\ OCl_2$ | Cyclohexane plus $C_8$–$C_{10}$ alkyl alcohol | Tri-n-octylamine | HCl | 1.002 |
| $Zr\ (SO_4)_2$ | Kerosene plus $C_8$–$C_{10}$ alkyl alcohol | Primene JMT | $H_2SO_4$ | 1.001 |
| $Zr\ OCL_2$ | $C_8$–$C_{10}$ alkyl alcohol plus Benzene or Kerosene or Methylisobutyl ketone | Aliquat 336 | HCl | 1.002 |
| $ZrO\ (NO_3)_2$ | Kerosene | Dibutylbutylphosphonate | $HNO_3$ | 1.003 |
| $Zr\ (SO_4)_2$ | Kerosene plus $C_8$–$C_{10}$ alkyl alcohol | Di(2,4,4'-trimethylpentyl) phosphinate | $H_2SO_4$ | 1.006 |
| $ZrO\ (ClO_4)_2$ | Benzene or Kerosene or Methylisobutyl ketone | Thenoyltrifluoroacetone | $HClO_4$ | 1.003 |

During the extraction and exchange steps of the present process, the volume ratio of the organic phase to the aqueous phase should be between 10:1 to 1:10, and the system maintained at a temperature of between 0°–60° C., preferably between 10°–50° C., with an ambient temperature of about 25° C. being most preferred, due to economics and ease of operation.

group consisting of quaternary ammonium salts, organic phosphonates, organic phosphinates, organic phosphates, organic sulfonates, primary amines, tertiary amines, polyethers, beta-diketones, and mixtures thereof, that preferentially extracts one of said isotopic portions, leaving an aqueous raffinate depleted in that isotopic portions and enriched in the other isotopic portion;

(B) stripping said organic solvent of its zirconium with an aqueous acidic strip medium to produce a first aqueous product stream;

(C) recycling said stripped organic solvent to step (A);

(D) evaporating water from a portion of said aqueous raffinate to produce a concentrated aqueous raffinate and a second aqueous product stream; and (E) recycling said concentrated aqueous raffinate to said feed stream.

2. The process as defined in claim 1 wherein a portion of said aqueous acidic strip medium, after said stripping, is transferred for use in said contacting.

3. The process as defined in claim 1 wherein said organic, water-immiscible solvent is selected from the group consisting of an alkyl hydrocarbon, an aryl hydrocarbon, or mixtures thereof.

4. The process as defined in claim 3 wherein said organic, water-immiscible solvent contains between 3-20 percent by volume of an alkyl alcohol containing 6-8 carbon atoms.

5. The process as defined in claim 1 wherein said organic, water-immiscible solvent contains said extractant medium in an amount of between 4:1 to 1:4 mole ratio relative to the zirconium present in the aqueous feed stream, based on an organic to aqueous volume ratio of 1:1.

6. The process as defined in claim 1 wherein said aqueous strip medium contains an inorganic acid selected from the group consisting of hydrochloric acid, nitric acid, sulfuric acid and perchloric acid.

7. The process as defined in claim 1 wherein said acid present in said aqueous strip medium is in an amount of 1-10 moles per liter.

8. The process as defined in claim 1 wherein said organic solvent is methylisobutyl ketone.

9. The process as defined in claim 8 wherein said methylisobutyl ketone contains an additional extractant medium.

10. The process as defined in claim 1 wherein said aqueous acidic strip medium contains hydrochloric acid.

11. A method according to claim 1 wherein a portion of said first aqueous product stream is recycled.

12. A method according to claim 1 wherein said contacting and stripping steps are performed in a plurality of stages to further increase the difference between said ratios.

13. A method according to claim 12 wherein the time for each stage is 2 to 120 minutes.

14. A method according to claim 1 wherein said feed stream is the aqueous raffinate stream from a zirconium-hafnium separation process.

15. A method according to claim 8 wherein said solvent is methylisobutyl ketone and said salt is a thiocyanate.

16. A method according to claim 1 wherein said $^{91-96}Zr$ portion is preferentially extracted into the water-immiscible organic contacting liquid.

17. A method according to claim 1 wherein said organic solvent is methylisobutyl ketone and said extractant is di(2,4,4'-trimethylpentyl)phosphinate.

18. A method according to claim 5 wherein said organic water-immiscible solvent is selected from the group consisting of methylisobutyl ketone, heptane, cyclohexane, $C_8$ to $C_{10}$ alkanol, kerosene, benzene, and mixtures thereof.

19. A method according to claim 3 wherein said solvent is an aryl hydrocarbon.

* * * * *